(12) United States Patent
Burger et al.

(10) Patent No.: US 11,593,334 B2
(45) Date of Patent: Feb. 28, 2023

(54) PHYSICAL DATABASE DESIGN AND TUNING WITH DEEP REINFORCEMENT LEARNING

(71) Applicant: Teradata US, Inc., San Diego, CA (US)

(72) Inventors: Louis Martin Burger, Escondido, CA (US); Emiran Curtmola, Los Angeles, CA (US); Sanjay Nair, El Segundo, CA (US); Frank Roderic Vandervort, Ramona, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 325 days.

(21) Appl. No.: 16/728,986

(22) Filed: Dec. 27, 2019

(65) Prior Publication Data
US 2021/0034588 A1 Feb. 4, 2021

Related U.S. Application Data

(60) Provisional application No. 62/881,810, filed on Aug. 1, 2019.

(51) Int. Cl.
*G06F 16/20* (2019.01)
*G06F 16/21* (2019.01)
(Continued)

(52) U.S. Cl.
CPC ........ *G06F 16/217* (2019.01); *G06F 16/2282* (2019.01); *G06F 16/24542* (2019.01); *G06N 3/04* (2013.01); *G06N 3/08* (2013.01)

(58) Field of Classification Search
CPC .............. G06F 16/217; G06F 16/2282; G06F 16/24542; G06N 3/04; G06N 3/08
(Continued)

(56) References Cited

U.S. PATENT DOCUMENTS

| 7,127,456 B1 | 10/2006 | Brown et al. |
| 7,499,907 B2 | 3/2009 | Brown et al. |

(Continued)

OTHER PUBLICATIONS

Ankur Sharma et al. The case for automatic database administration using deep reinforcement learning. arXiv:1801,05643v1. Jan. 17, 2018.

(Continued)

*Primary Examiner* — Vincent F Boccio
(74) *Attorney, Agent, or Firm* — Gates & Cooper LLP

(57) ABSTRACT

An apparatus, method and computer program product for physical database design and tuning in relational database management systems. A relational database management system executes in a computer system, wherein the relational database management system manages a relational database comprised of one or more tables storing data. A Deep Reinforcement Learning based feedback loop process also executes in the computer system for recommending one or more tuning actions for the physical database design and tuning of the relational database management system, wherein the Deep Reinforcement Learning based feedback loop process uses a neural network framework to select the tuning actions based on one or more query workloads performed by the relational database management system.

20 Claims, 10 Drawing Sheets

```
Environment Condition      Description
Active_Full_Tuning         Active DRIL workflow using all available tuning action types
Suspend_Creation_Tuning    Active DRIL workflow restricted to Drop tuning action types
Suspend_All_Tuning         DRL workflow stopped If Service_Level_Agreement met
      Environment_Condition = Suspend_All_Tuning
Else If no more available space
      Environment_Condition = Suspend_Creation_Tuning
Else /* default */
      Environment_Condition = Active_Full_Tuning
```

(51) Int. Cl.
  *G06F 16/22*     (2019.01)
  *G06N 3/04*      (2023.01)
  *G06N 3/08*      (2023.01)
  *G06F 16/2453*   (2019.01)

(58) Field of Classification Search
  USPC .......................................................... 707/718
  See application file for complete search history.

(56)        References Cited

U.S. PATENT DOCUMENTS

| 8,151,269 | B1 |    | 4/2012  | Brown et al. |            |
|-----------|----|----|---------|--------------|------------|
| 10,846,616| B1 | *  | 11/2020 | Busbridge    | G06N 20/00 |
| 2004/0002957 | A1 | * | 1/2004 | Chaudhuri  | G06F 16/284 |
| 2004/0003004 | A1 | * | 1/2004 | Chaudhuri  | G06F 16/22 |
| 2007/0192280 | A1 | * | 8/2007 | Agrawal    | G06F 16/28 |
| 2019/0102676 | A1 | * | 4/2019 | Nazari     | G06K 9/627 |
| 2020/0226109 | A1 | * | 7/2020 | Das        | G06F 16/27 |
| 2020/0272667 | A1 | * | 8/2020 | Ding       | G06F 16/901 |

OTHER PUBLICATIONS

Francisco S. Melo et al. An analysis of reinforcement learning with function approximation, Proceedings of the 25th International conference on Machine learning, p. 664-671, Jul. 5-9, 2008.

Gary Valentin et al. DB2 advisor: an optimizer smart enough to recommend its own indexes. ICDE 2000.

Jennifer Ortiz et al. Learning State Representations for Query Optimization with Deep Reinforcement Learning. arXiv:1803.08604v1. Mar. 22, 2018.

Ji Zhang et al. An End-to-End Automatic Cloud Database System Using Deep Reinforcement Learning. SIGMOD '19. Jun. 30-Jul. 5, 2019.

Konstantinos Morfonios et al. Consistent Synchronization Schemes for Workload Replay. Proceedings of the VLDB Endowment. vol. 4, No. 12. pp. 1225-1236. Aug. 29-Sep. 3, 2011.

Renata Borovica et al. Automated physical designers: what you see is (not) what you get. DBTest '12. May 21, 2012.

Ryan Marcus et al. Deep Reinforcement Learning for Join Order Enumeration. arXiv:1803.00055v2. Mar. 12, 2018.

Ryan Marcus et al. Flexible Operator Embeddings via Deep Learning, arXiv:1901.09090v2. Jan. 31, 2019.

Ryan Marcus et al. Towards a Hands-Free Query Optimizer through Deep Learning. 9th Biennial Conference on Innovative Data Systems Research (CIDR '19). Jan. 13-16, 2019.

Shrainik Jain et al. Query2Vec: An Evaluation of NLP Techniques for Generalized Workload Analytics. arXiv:1801.05613v2. Feb. 2, 2018.

Sudipto Das et al., Automatically Indexing Millions of Databases in the Microsoft Azure SQL Database. Proceedings of ACM SIGMOD conference (SIGMOD '19). Jun. 2019.

Surajit Chaudhuri et al. An efficient cost-driven index selection tool for Microsoft SQL server. Proceedings of the 23rd VLDB Conference. 1997.

Teradata Vantage: The Platform for Pervasive Data Intelligence. 2019. www.teradata.com/Products/Software/Vantage.

Viktor Leis et al. How good are query optimizers, really? Proceedings of the VLDB Endowment. vol. 9, No. 3. 2015.

Yuxi Li. Deep Reinforcement Learning: An Overview. arXiv:1701.07274v6. Nov. 26, 2018.

* cited by examiner

1. If in observation mode
    Retrieve the next tuning action A recommended by the Advisor.
    Use VFA to predict the value V from performing tuning action A on
      the current query workload configuration $C_{i-1}$.
   Else
    Using DRIL's neural network framework, predict and recommend a
    next tuning action A to perform.
    Record the VFA predicted value V for the tuning action A.
2. Apply tuning action A to the current query workload configuration $C_{i-1}$
    resulting in a new query workload configuration $C_i$.
3. Compute a reward R of the tuning action A using the Reward Function
    on the new query workload configuration.
    This state transition is denoted by: $T_i = (C_{i-1}, A, C_i, R)$
4. The DRIL's neural network framework is trained using $T_i$ where a positive
    reward R compels the DRIL's neural network framework to recommend
    tuning action A on future query workload configurations that are similar
    to $C_{i-1}$.
5. If (R <= 0 and in observation mode) /* If negative reward */
    NUM_FALSE_POSITIVES++;
    If V <= 0 /* DRIL predicted a negative reward */
        NUM_FALSE_POSITIVES_PREDICTED++;
    If minimum time duration and
    (NUM_FALSE_POSITIVES_PREDICTED / NUM_FALSE_POSITIVES) > 0.667
        switch to active mode.
6. Restart learning in step 1

*FIG. 3*

| Feature Name | Example Values | Vectorized Representation |
|---|---|---|
| Operator Type | InnerJoin, SingleTable | Numeric position of value within enumerated set |
| Source 1 Relation or Expression | CUSTOMER | NLP word embedding |
| Source 2 Relation or Expression | SALES | NLP word embedding |
| Workload Frequency | 42 | Feature's integer value |
| Projection Column List | C_NAME, S_DATE | NLP word embedding |
| Condition (Predicate) | C_CUSTKEY = S_CUSTKEY, C_STATE = 'CA' | Preprocessing to remove literal constants followed by NLP word embedding |
| Condition Selectivity | .05 | Feature's floating point value |
| Indexable Condition Flag | True | 0 or 1 |
| Current Indexes for Source 1 | Index(C_CUSTKEY) Order By Hash | NLP word embedding |
| Current Indexes for Source 2 | Null | NLP word embedding |
| Average CPU Usage | 3.20 | Feature's floating point value |
| Average I/O Count | 50320 | Feature's integer value |

*FIG. 5*

Query Expressions and Costs
QE3: QE1 InnerJoin QE2 on C_CUSTKEY = S_CUSTKEY, cost = 10 seconds
QE1: SingleTable SELECT SALES, cost = 5 seconds
QE2: SingleTable SELECT CUSTOMER on C_STATE = 'CA', cost = 2 seconds

```
Given:
    N_QE_A is the number of distinct QEs relevant to tuning action A
        that was applied at time T
    N_QE_AT is the number of N_QE_A instances whose performance
        has been revaluated after time T If ( N_QE_AT / N_QE_A > 0.50 ) or ( current timestamp – AT ) > 1 week
    Call Reward Function (AT)
Else
    Sleep (1 hour)  /* try again later */
```

*FIG. 8*

| Environment Condition | Description |
| --- | --- |
| Active_Full_Tuning | Active DRIL workflow using all available tuning action types |
| Suspend_Creation_Tuning | Active DRIL workflow restricted to Drop tuning action types |
| Suspend_All_Tuning | DRL workflow stopped |

```
If Service_Level_Agreement met
     Environment_Condition = Suspend_All_Tuning
Else If no more available space
     Environment_Condition = Suspend_Creation_Tuning
Else  /* default */
     Environment_Condition = Active_Full_Tuning
```

FIG. 9

PHYSICAL DATABASE DESIGN AND TUNING WITH DEEP REINFORCEMENT LEARNING

CROSS REFERENCE TO RELATED APPLICATIONS

This application is related to the following co-pending and commonly-assigned application:

U.S. Provisional Patent Application Ser. No. 62/881,810, filed on Aug. 1, 2019, by Louis Martin Burger, Emiran Curtmola, Sanjay Nair, Frank Roderic Vandervort and Douglas P. Brown, and entitled "PHYSICAL DATABASE DESIGN & TUNING WITH DEEP REINFORCEMENT LEARNING," attorneys' docket number 19-1030; which application is incorporated by reference herein.

BACKGROUND OF THE INVENTION

1. Field of the Invention

This invention relates to methods and techniques for physical database design and tuning in relational database management systems.

2. Description of Related Art (Note: This application references a number of different patents and publications as indicated throughout the specification by one or more reference numbers within brackets [x]. A list of these different patents and publications ordered according to these reference numbers can be found below in the section entitled "References." Each of these publications is incorporated by reference herein.)

Computer systems implementing a relational database management system are well known in the art. Physical database design and tuning in relational database management systems is critical to achieving a required performance. However, physical database design and tuning tends to be a manually intensive task, notwithstanding the availability of some automated tools.

There is a need in the art for additional automated tools for physical database design and tuning. The present invention satisfies this need.

SUMMARY OF THE INVENTION

One or more embodiments of the invention provides an apparatus, method and computer program product for physical database design and tuning in relational database management systems. A relational database management system is executed in a computer system, wherein the relational database management system manages a relational database comprised of one or more tables storing data. A Deep Reinforcement Learning based feedback loop process is also executed in the computer system for recommending one or more tuning actions for physical database design and tuning of the relational database management system, wherein the Deep Reinforcement Learning based feedback loop process uses a neural network framework to select the tuning actions based on one or more query workloads performed by the relational database management system.

The DRL-based feedback loop process may include an observation mode and an active mode, wherein the observation mode allows the DRL-based feedback loop process to train and learn the tuning actions recommended by an Advisor tool, before transitioning to the active mode of the DRL-based feedback loop process recommending the tuning actions.

The DRL-based feedback loop process may use vector encoding of the query workloads to train the neural network framework. The query workloads are comprised of one or more query expressions (QEs) stored in a Query Expression Repository (QER) by an Optimizer, wherein the QER stores the QEs that are most relevant to the physical database design and tuning of the RDBMS.

The DRL-based feedback loop process may include a Reward Function that generates a positive or negative indicator of the tuning actions' success or failure, and the Reward Function accesses a Query Pattern Store (QPS) that tracks performance of the query workloads over time coinciding with the tuning actions, wherein the DRL-based feedback loop process reverses the tuning actions that result in the negative indicator from the Reward Function.

The DRL-based feedback loop process may be managed by one or more Environment Conditions that indicate whether the DRL-based feedback loop process is to apply the tuning actions, suspend the tuning actions, or suspend a workflow of the DRL-based feedback loop process.

BRIEF DESCRIPTION OF THE DRAWINGS

Referring now to the drawings in which like reference numbers represent corresponding parts throughout:

FIG. 3 describes the logic performed by the DRL-based feedback loop process in both observation and active modes.

FIG. 5 summarizes the characteristics that serve as input to the neural network framework of the DRL-based feedback loop process.

FIG. 8 summarizes the logic for determining when a sufficient portion of performance data can be removed from the Query Pattern Store when no longer needed by the Reward Function.

FIG. 9 describes Environment Conditions that are introduced to control the workflow of the DRL-based feedback loop process.

DETAILED DESCRIPTION OF THE PREFERRED EMBODIMENT

Figure 1:
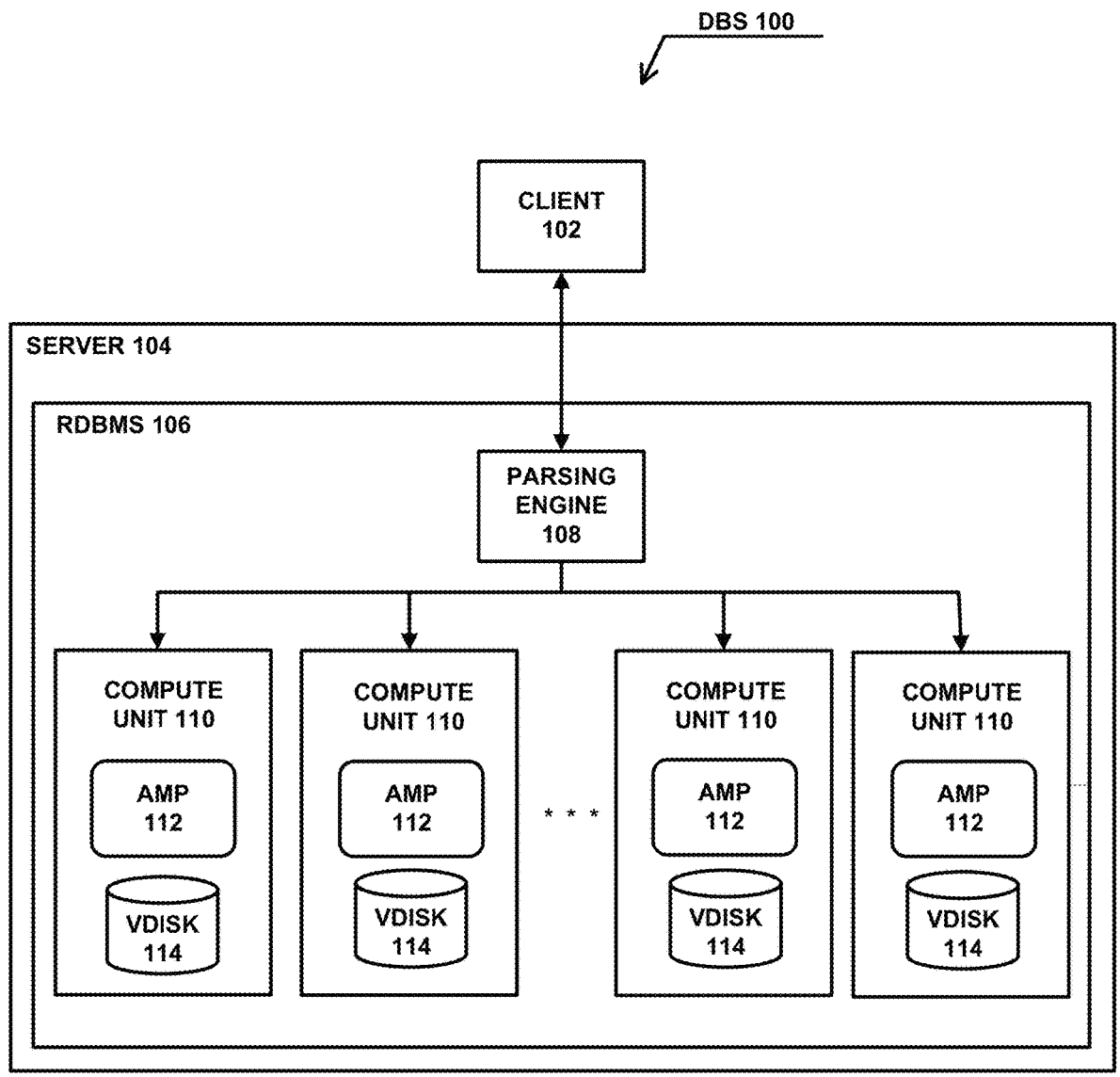
FIG. 1 illustrates an exemplary hardware and software environment according to one embodiment of the present invention.

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention applies Deep Reinforcement Learning (DRL), in conjunction with Query Optimizer-based Advisor tools, to the issue of physical database design and tuning in a relational database management system. Previously, DRL has shown great promise in game-playing and other problem domains related to strategy.

DRL performs unsupervised trial and error learning via a deep neural network based on observed rewards. It is commonly used in situations where the system must make step-by-step decisions to reach a goal and, like other deep learning methods, it is very good at finding important patterns and features within large data sets. As such, it is well suited for automating the task of physical database design and tuning, which is currently performed by overburdened Database Administrators (DBAs) equipped only with inaccurate Query Optimizer-based Advisor tools.

Unfortunately, existing DRL methods are not capable of handling the unique challenges of a commercial database query processing environment. The customizations needed for this problem domain extend beyond simple adjustments to a general purpose model or its hyper-parameters. Difficult barriers that must be overcome include a huge feature set that is impractical to encode into a representation for learning, customer environments that cannot tolerate mistakes that often occur during the early phases of trial and error learning, and a permissible action set that requires intimate knowledge of a given Optimizer and its physical access methods.

Problems Solved and Use Cases

DBAs are overburdened with tasks related to physical database design and tuning, but such tasks are critical to achieving a required workload performance. Customers using database and analytics systems routinely complain that their DBAs spend an excessive percentage of their time tuning both new and existing workloads, and are demanding more automated solutions.

Inaccuracy of Advisor Tools

Existing commercial database tuning relies on Query Optimizer-based Advisor tools [1,2,3], most of which were originally developed in the early 2000's. These are helpful tools, but DBAs must still manually review and audit their actions. The strength of such Advisor tools lies in their tight integration with the Query Optimizer, thereby assuring that their recommended actions are valid and promising actions for a given workload.

In the case of index tuning, such Advisor tools analyze the predicates of logged queries to identify candidate index columns. After aggregating the set of indexable columns across a workload, the Advisor tools simulate the existence of alternative index configurations within a Data Dictionary, before invoking the Optimizer in a special "what-if" plan selection mode. Such invocations or calls determine which candidate indexes would be chosen by the Optimizer, if they existed, and their estimated cost improvements to workload queries.

Unfortunately, experience with real-world customer workloads has proven that Optimizer estimates are frequently inaccurate [12] and fail to account for all of the runtime performance factors. As a result, there is often little or no improvement after the indexes recommended by the Advisor tools are actually created. [4]

Barriers to Applying DRL Methods

DRL methods have shown great promise in domains related to strategy and game playing, and are naturally suited for automating physical database design and tuning. Although DRL methods have been proposed for database administration and tuning [5], no practical methods have been devised to overcome the challenges of a complex commercial database query processing environment, where such challenges include the following:

a) Large Feature Set

The input to tools for physical database design and tuning includes a query workload whose characteristics includes the query text, Optimizer plans, table schemas, data demographics, and machine configuration. Given its enormous combined size, specialized preprocessing techniques are required to identify and generate a succinct encoded representation suitable for input to a neural network.

b) Long and Painful Learning Curve

Because of the nature of its unsupervised trial and error learning approach, the early tuning actions taken by DRL are likely to be either invalid or result in a highly negative reward. Enterprise systems, including even those designated for test or data lab environments, cannot tolerate the disruptions that result from highly negative tuning actions. To overcome this, a special pre-training phase is required before employing a DRL solution on most systems.

c) Complex Permissible Action Set

Unlike many other problem domains, the set of permissible actions for physical database design and tuning is very difficult to encode or configure within a DRL solution. Physical database design and tuning requires an intimate knowledge of the functions of the Query Optimizer, along with its supported access methods, join algorithms, index types, partitioning methods, and the numerous options and usage rules for each of these. Specialized algorithms are needed to assist the DRL in understanding and exploring the permissible action space for tuning a particular database or analytics system.

d) Complex Reward Function

The function that observes and calculates the reward from applying a given action to the physical database design and tuning is quite complex and often requires a significant amount of time before it can be fully measured. The reward function must accurately compute the performance gain (or loss) from re-running the same or similar query workload after applying one or more actions. The majority of customer environments have at least some ad hoc query activity and many equivalent queries differ only by constant literals or trivial syntax. All of these issues make it challenging to calculate the differences between workloads' performance after applying tuning actions.

e) Ill-Defined Terminal States

Physical database design and tuning is inherently a continuous learning problem without terminal states that are common to most problem domains. However, all tuning should typically be suspended once a workload achieves its Service Level Agreement (SLA), but must be resumed if that ideal condition is subsequently lost. In addition, certain types of tuning actions must be suspended when upper bounds related to system configuration limits are reached (e.g., a maximum number of indexes). The DRL strategy and workflow must be customized to handle these special suspension states.

f) Establishing Trust and the Black Box Effect

Although DBAs would likely prefer a fully autonomous tuning environment, they are ultimately responsible for their system and hence still require "explainable" evidence that justifies why a particular tuning action was recommended or applied. Unfortunately, standard DRL methods operate as a "black box" with little or no explanation and cannot satisfy this visibility requirement.

Query Optimizer-based Advisor Tools with Customized DRL

This invention overcomes these challenges by infusing existing Query Optimizer-based Advisor tools with customized DRL methods to develop a new hybrid best in class solution for the issue of physical database design and tuning in a relational database management system.

Hardware and Software Environment

FIG. 1 illustrates an exemplary hardware and software environment according to one embodiment of the present invention. In the exemplary environment, a database system (DBS) 100 is a computer system that implements a client-server architecture, wherein one or more client computers 102 may include, inter alia, a graphical user interface (GUI), which allows one or more users to interface with one or more server computers 104, which implement an RDBMS 106 that stores data and metadata in a relational database comprised of one or more tables storing the data and metadata. The DBS 100 may be implemented in separate machines, or may be implemented as separate or related processes in a single machine.

In one embodiment, the RDBMS 106 includes a parsing engine (PE) 108 that organizes storage of the data and coordinates retrieval of the data from the storage, one or more compute units 110 executing one or more access module processors (AMPs) 112 performing the functions of the RDBMS 106, and one or more virtual disks (VDISKs) 114 storing the relational database of the RDBMS 106. The compute units 110 comprise processors, and the AMPs 112 and VDISKs 114 comprise processes that may be implemented in one or more separate machines or in a single machine.

The RDBMS 106 used in one embodiment comprises the Teradata® RDBMS sold by Teradata US, Inc., the assignee of the present invention, although other DBMS's could be used. In this regard, the Teradata® RDBMS is a hardware and software based data warehousing and analytic application/database system.

Generally, users of the system 100 interact with the client computers 102 to formulate requests for the RDBMS 106 executed by the server computers 104, wherein the requests access data stored in the RDBMS 106, and responses are received therefrom. In response to the requests, the RDBMS 106 performs the functions described below, including processing data retrieved from the RDBMS 106. Moreover, the results from these functions may be provided directly to the client computers 102, or may be provided to other computer systems (not shown), or may be stored by the RDBMS 106 in the relational database.

Note that, in one or more embodiments, the system 100 may use any number of different parallelism mechanisms to take advantage of the parallelism offered by the multiple tier architecture, the client-server structure of the client computers 102, server computers 104, RDBMS 106, PE 108, and the multiple compute units 110, AMPs 112 and VDISKs 114 of the RDBMS 106. Further, data within the relational database may be partitioned across multiple data storage devices to provide additional parallelism.

Generally, the client computers 102, server computers 104, RDBMS 106, PE 108, compute units 110, AMPs 112 and VDISKs 114 comprise hardware, such as computers, processors, data storage devices and networks, and software, such as instructions, logic and/or data tangibly embodied in and/or accessible from a device, media, or carrier, such as RAM, ROM, one or more of the data storage devices, and/or a remote system or device communicating with the DBS 100 via one or more of the networks, thereby making a computer program product or article of manufacture according to the invention. As such, the terms "article of manufacture," "program storage device" and "computer program product" as used herein are intended to encompass a computer program accessible from any computer readable device, media or carrier. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Technical Description

The present invention describes a DRL-based feedback loop process for recommending tuning actions for the RDBMS 106, wherein the DRL-based feedback loop process learns from past tuning actions to improve future tuning actions made under similar circumstances. The solution of the present invention to the problems and challenges listed above is to retain the best features of existing Advisor tools and infuse them with customized DRL methods to significantly improve the quality of recommendations.

The DRL-based feedback loop process significantly improves upon the accuracy of the previously described Query Optimizer "what-if" costing estimation method. Retaining other aspects of the existing Advisor tools including a tight integration with the Query Optimizer allows this solution to overcome many of the DRL barriers listed above.

In one embodiment, the DRL-based feedback loop process focuses on one specific aspect of physical database design and tuning, namely, index selection. However, it is important to note that this invention can be extended to other embodiments focusing on other aspects of physical database design and tuning, including the collection of statistics and workload management.

Architecture and Analytics System

Figure 2:
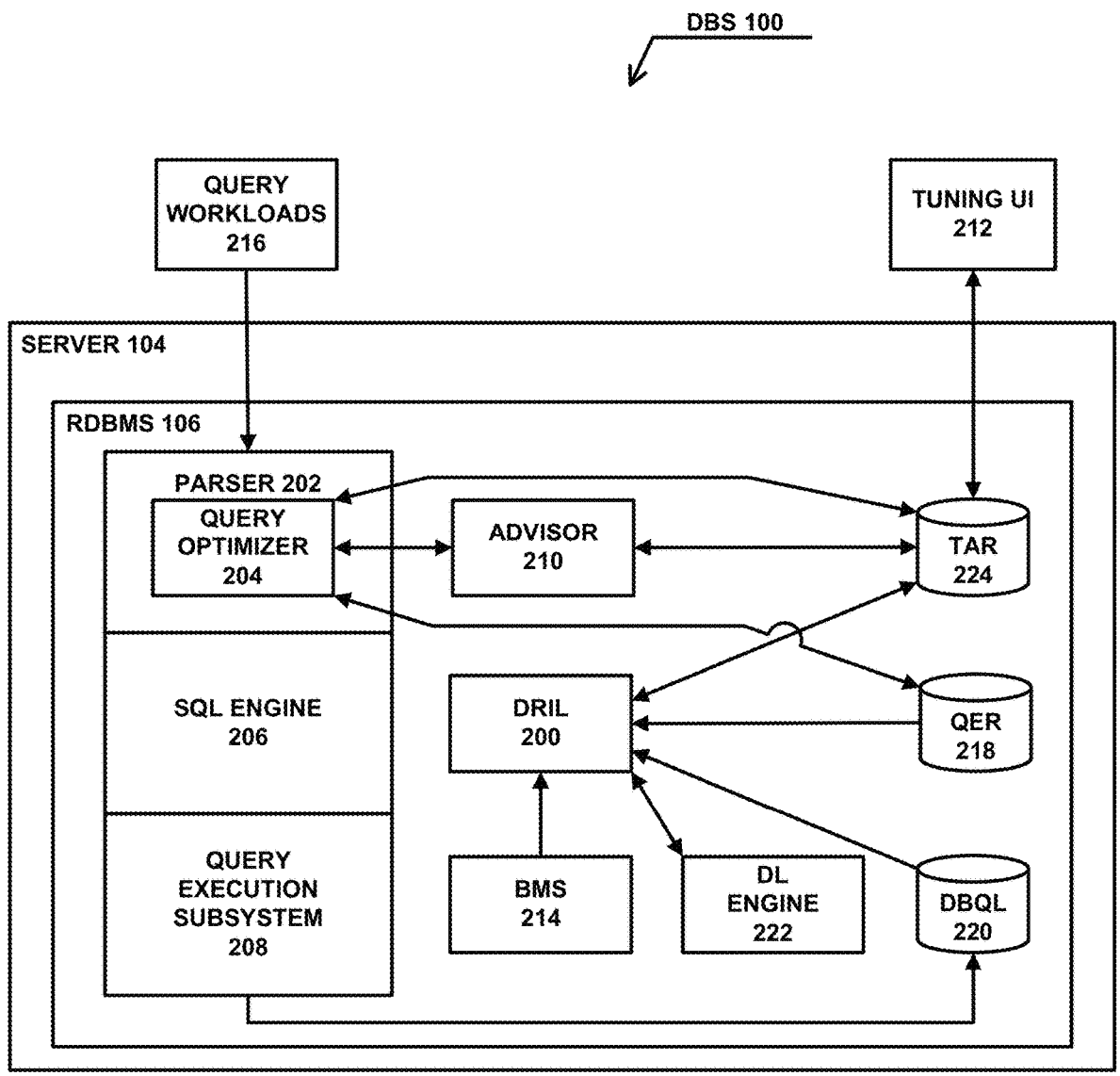
FIG. 2 is a block diagram that illustrates the architecture of used with a Deep Reinforcement Learning (DRL) based feedback loop process, in the context of the analytics system provided by the relational database management systems, according to one embodiment.

FIG. 2 is a block diagram that illustrates the architecture used with a DRL-based feedback loop process, in the context of an analytics system provided by the RDBMS 106, according to one embodiment. In this embodiment, the DRL-based feedback loop process is focused on index selection, and is referred to herein as Deep Reinforcement Index Learning (DRIL) 200. Also in this embodiment, the RDBMS 106 includes a Parser 202, which incorporates a Query Optimizer 204, an SQL Engine 206, and a Query Execution Subsystem 208, which interact with the DRIL 200.

The DRIL 200 is implemented as an offline learning process that operates within the query processing and execution environment of the RDBMS 106, such as Teradata's Vantage System. [6] The DRIL 200 is capable of working in conjunction with an already existing Query Optimizer-based tuning Advisor tool 210 to share tuning responsibilities and complement each other's strengths. The DRIL 200 can be manually invoked or scheduled by a DBA via a tuning User Interface (UI) 212, or scheduled autonomously via a Background Monitoring Service (BMS) 214.

The primary input to the DRIL 200 comprises one or more query workloads 216 captured during the parsing, interpreting and optimizing of query expressions (QEs) found in the query workloads 216 by the Parser 202, Query Optimizer 204, and SQL Engine 206, wherein the QEs are logged to a persistent Query Expression Repository (QER) 218. [7] The QEs of the query workloads 216 logged to the QER 218 are then supplemented with runtime resource usage metrics captured from the Query Execution Subsystem 208 and logged within a Database Query Logging (DBQL) facility 220. [9] The DRIL 200 executes its neural network framework using this input on a specialized deep learning engine 222 capable of running TensorFlow™ or another suitable machine learning (ML) language.

Tuning actions recommended by the DRIL 200 or the Advisor 210 typically comprise Structured Query Language (SQL) Data Definition Language (DDL) statements (e.g., CREATE INDEX and DROP INDEX SQL DDL statements), and are stored in a dedicated Tuning Actions Repository (TAR) 224. Depending on the configured level of automation, these tuning action recommendations may need to be manually reviewed and approved by the DBA prior to being scheduled for application by the Background Monitoring Service 214. The DRIL 200 allows the DBA to configure which objects in the RDBMS 106 are to be automatically tuned and which are to remain under the manual control of the DBA. For those designated for automatic tuning, the DRIL 200 supports a fully autonomous mode that requires no pre-approval by the DBA, and a semi-autonomous mode that requires pre-approval by the DBA of the tuning action recommendations before actually applying them.

Reinforcement Learning and Training Phase

The DRIL 200 operates in different phases or modes, depending on the extent of its training after being installed on the DBS 100. In an initial observation mode, the Query Optimizer-based tuning Advisor tool 210 is used to recommend tuning actions and the DRIL 200 observes these recommended tuning actions to learn the set of permissible actions and the rewards that result from specific actions taken under specific conditions. Although the quality of recommendations generated in this mode suffers from the previously mentioned limitations of "what-if" costing by the Advisor 210, it is significantly better than the quality associated with early DRL-based training.

After a sufficient period of learning, in a subsequent active mode, the DRIL 200 assumes responsibility for recommending tuning actions, as its abilities surpass the Advisor 210. During this mode, the DRIL 200 discovers patterns in its rich feature set that the cost model of the Optimizer 204 cannot discover.

FIG. 3 describes the logic performed by the DRIL 200 in both observation and active modes. As part of its policy (i.e., strategy), the DRIL 200 employs a Value Function Approximator (VFA) [10,11] to estimate the reward from an individual candidate tuning action. The VFA is also made accessible to the Advisor 210 to provide a DRL-based reward estimate for its generated tuning actions. The VFA reward value is stored along with each Advisor 210 tuning action recommendation as a binary flag indicating DRIL's 200 prediction as to whether it was a good tuning action (positive VFA) or a bad tuning action (negative VFA). After each tuning action is applied to the query workloads 216 and a Reward Function of the DRIL 200 calculates its actual benefit, the accuracy of the DRIL's 200 prediction can be measured.

Quality issues surrounding recommendations generated by the Advisor 210 usually manifest themselves as an excessive number of recommendations that fail to produce a performance benefit after application, which are referred to as "false positives." The DRIL's 200 prediction abilities are assumed to have exceeded those of the Advisor 210 when it correctly predicts the failure of a certain percentage of false positives generated by the Advisor 210 over a configured minimum time period. When this occurs, the DRIL 200 switches its mode from observation mode to active mode.

Referring to the specific logic shown in FIG. 3, in step 1, if the DRIL 200 is in observation mode, then the DRIL 200 retrieves the next tuning action A recommended by the Advisor 210. The DRIL 200 then uses the VFA to predict a value V from taking tuning action A on a current query workload 216 configuration Ci-1. Otherwise, if the DRIL 200 is not in observation mode, then the DRIL 200 uses its neural network framework to predict and recommend a next tuning action A to perform, and records the VFA predicted value V from taking the next tuning action A.

In a step 2, the DRIL 200 applies tuning action A to the current query workload 216 configuration Ci-1 resulting in a new query workload 216 configuration Ci.

In a step 3, the DRIL 200 computes a reward R from the applied tuning action using the Reward Function on the new query workload 216 configuration. This state transition is denoted by: Ti=(Ci-1, A, Ci, R).

In a step 4, the neural network framework of the DRIL 200 is trained using Ti, wherein a positive reward R will compel the neural network framework to recommend tuning action A on future query workload 216 configurations that are similar to Ci-1.

In a step 5, if R <=0 and the DRIL 200 is in observation mode, which indicates a negative reward, then a counter NUM_FALSE_POSITIVES is incremented. If V<=0, which indicates that the DRIL 200 predicted a negative reward, then a counter NUM_FALSE_POSITIVES_PREDICTED is incremented. If a minimum time duration has expired and NUM_FALSE_POSITIVES_PREDICTED divided by NUM_FALSE_POSITIVES is greater than 0.667 (or some other value), then the DRIL 200 switches from observation mode to active mode.

In a step 6, the DRIL 200 learning restarts from the step 1 above.

Neural Network Framework

Figure 4:
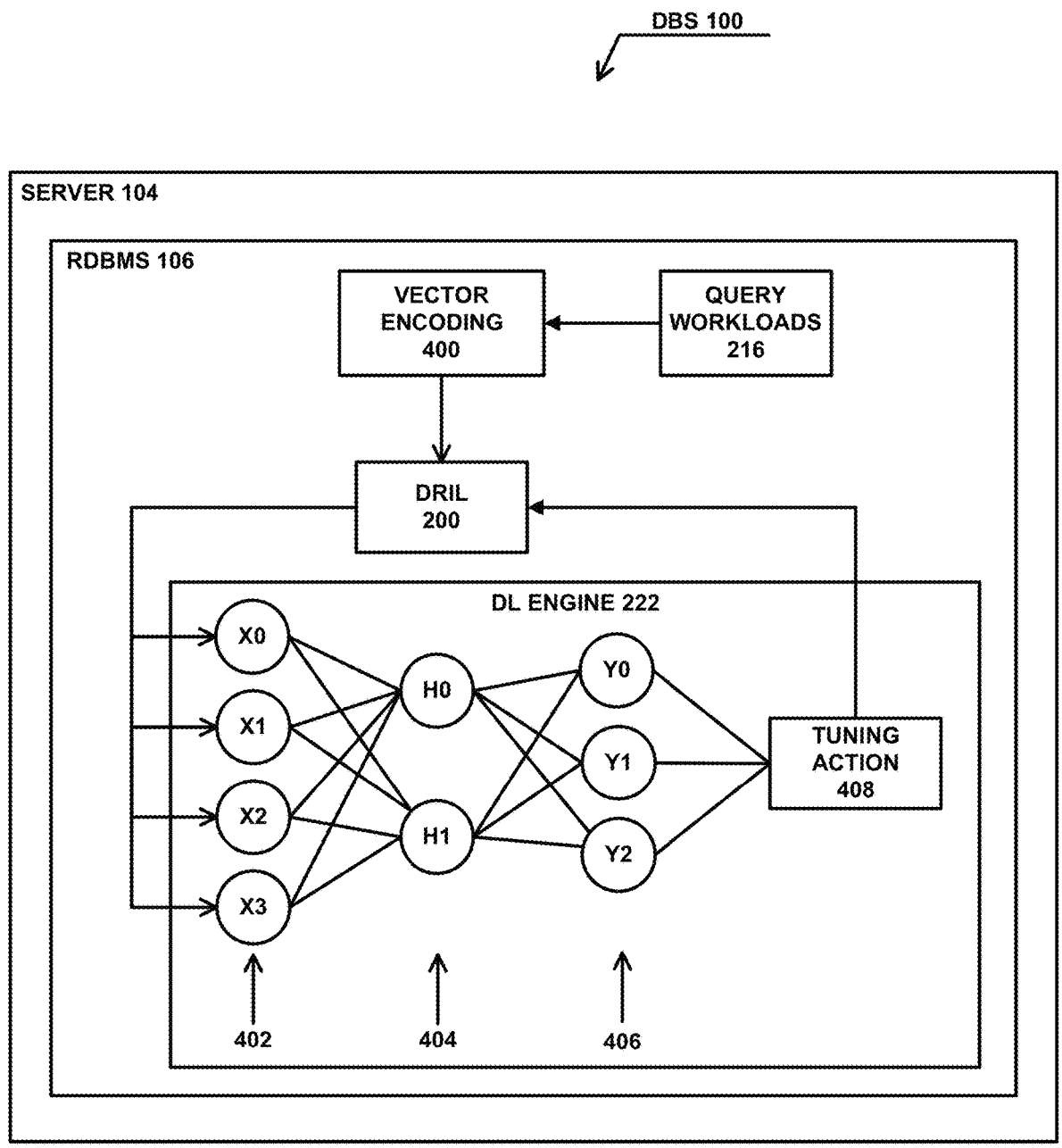
FIG. 4 illustrates a neural network framework implemented by the DRL-based feedback loop process.

The state transitions described above operate within a neural network framework [14], where the policy is determined through a set of network weights. FIG. 4 illustrates the operation of the specialized deep learning engine 222 as it executes the neural network framework implemented by the DRIL 200. Vector encoding 400 is applied to the QEs of one or more of the query workloads 216 stored in the QER 218 to generate a vectorized representation of the query workloads 216, and the vectorized representation is used to configure the neural network framework implemented by the DRIL 200, namely, the vectorized representation is fed into nodes (X0, X1, X2, X3) of a state layer 402, and each value from the nodes (X0, X1, X2, X3) of the state layer 402 is transferred and sent through a series of nodes (H0, H1) in hidden layers 404, before reaching nodes (Y0, Y1, Y2) of a final action layer 406, that selects one or more tuning actions 408 based on the values of the nodes (Y0, Y1, Y2) of the final action layer 406.

Overcoming Barriers with Standard DRL Methods Feature Set and Encoding

As noted above, the QER 218 [7] provides the primary input on which to base the DRIL's 200 vector representation of the query workloads 216. The QER 218 is populated as an extension to the DBQL facility 220 and stores data on the query workloads 216 received from the Optimizer 204, along with runtime resource usage generated by the Query Execution Subsystem 208 and stored in the DBQL facility 220. The QER 218 is specifically designed to store characteristics of QEs from each of the query workloads 216 that are most relevant to query optimization, including predicate selectivity and indexing opportunities. Conversely, features of the query workloads 216 that are not relevant to query optimization are filtered out and not included in the QER 218. The QEs may be commonly used across the query workloads 216, and are identified and stored in the QER 218 as distinct entries along with frequency counters indicating how often the QEs are used by the query workloads 216. The resulting preprocessed and summarized characteristics of the query workloads 210 stored in the QER 218 are well suited for vector encoding 400 into the vectorized representation used by the DRIL 200.

In addition to the query workloads 216, the DRIL 200 also uses characteristics of the current database configuration, most notably definitions of existing indexes in the RDBMS 106. Characteristics of the query workloads 216 and the current database configuration are naturally represented as text, including projection lists, conditions (predicates), and index definitions, all of which are well suited for vector encoding 400 into the vectorized representation used by the DRIL 200, for example, using Natural Language Processing (NLP) word embedding techniques built upon Doc2Vec. [8]

FIG. 5 summarizes these characteristics, which include Feature Name, Example Values and the resulting Vectorized Representation, that serve as input to the neural network framework of the DRIL 200, for an example query workload 216 set forth below:

| SELECT | C_NAME, S_DATE |
| FROM | CUSTOMER, SALES |
| WHERE | C_CUSTKEY = S_CUSTKEY |
| | AND |
| | C_STATE = 'CA' |

Pre-Training and Permissible Action Set

Prior to installing the DRIL 200 on the DBS 100, the neural network framework of the DRIL 200 may be pre-trained using performance benchmarks tuned by expert DBAs. For example, using a Workload Replay tool [13] on the captured query logs from such benchmarks, the DRIL 200 can observe the tuning actions across time and can compare the resulting rewards to the performance of query workloads 216. In this special replay mode, the Advisor tool 210 is not employed and instead the DRIL 200 is simply observing and learning from the logged tuning actions of the DBA experts. This pre-training ensures that the DRIL 200 installed on the DBS 100 is seeded with a certain minimum level of tuning knowledge and a basic understanding of the permissible or legal action set as defined by the Optimizer's 204 supported index types and their usage rules.

Upon installation on the DBS 100, the DRIL 200 initially operates in the previously described observation mode where the Advisor 210 recommends tuning actions based on its hand-crafted knowledge of the Optimizer 204. After a sufficient period of observing tuning actions taken on specific query workloads 216, the DRIL 200 switches to active mode and takes responsibility for exploring the permissible set of tuning actions. Any resulting illegal tuning actions, which hopefully are rare, will result in a "user" error being returned by an SQL DDL statement that attempted to apply the tuning action (e.g., a CREATE INDEX SQL DDL statement). The returned value from the Reward Function for an illegal action is highly negative to discourage similar errors in the future.

Reward Function and Query Pattern Store

The Reward Function of the DRIL 200 requires collecting and comparing runtime performance for query workloads 216 before and after the application of tuning actions. In addition to elapsed times for query workloads 216, the previously mentioned DBQL facility 220 is capable of measuring resource usage for a given query workload 216 or for individual steps within the query workload 216, wherein the individual steps comprise QEs stored within the QER 218. In addition, QEs have parent-child relationships that allow for the formation of QE trees representing larger QE patterns or an entire query workload 216.

Figures 6A, 6B:
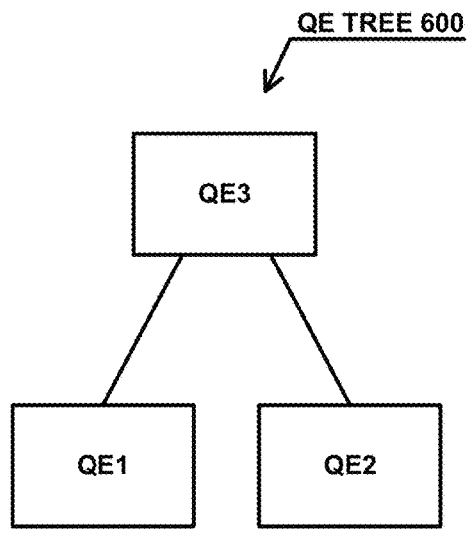
FIG. 6A illustrates a set of query expressions and their costs for an example query workload.
FIG. 6B illustrates a query expression tree for the set of query expressions.

FIG. 6A illustrates a set of QEs and their costs for the following example query workload 216:

| SELECT | C_NAME, S_DATE |
| FROM | CUSTOMER, SALES |
| WHERE | C_CUSTKEY = S_CUSTKEY |
| | AND C_STATE = 'CA' |

In addition, FIG. 6B illustrates a QE tree 600 for the set of QEs from the example query workload 216.

Figure 7:
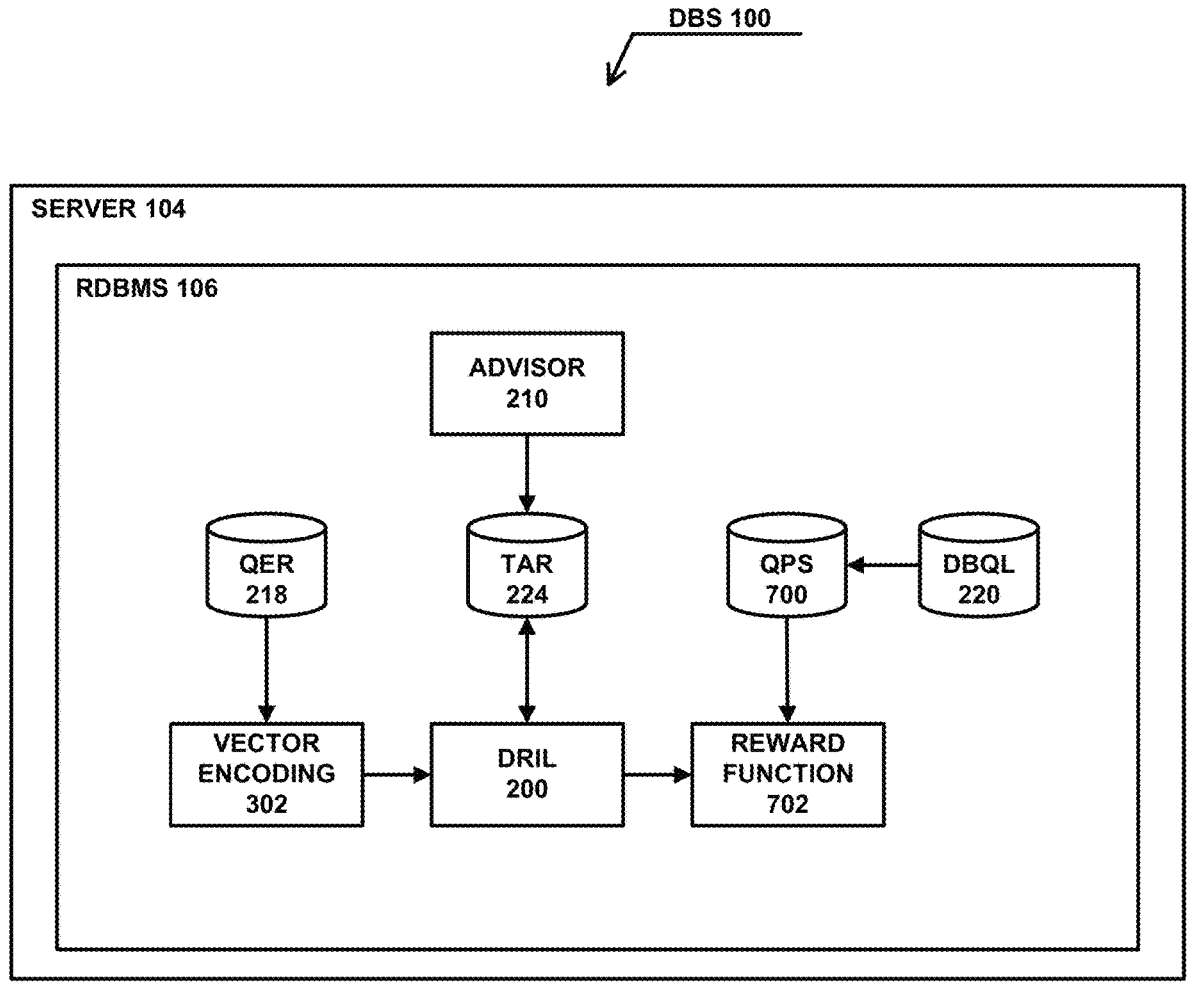
FIG. 7 illustrates the use of a Query Pattern Store to support a Reward Function of the DRL-based feedback loop process.

FIG. 7 illustrates the use of a Query Pattern Store (QPS) 700 to support the Reward Function 702 of the DRIL 200, wherein the QPS 700 is maintained by the QER 218 and tracks runtime performance data from the DBQL facility 220 over time. The QPS 700 maintains a single entry for each distinct QE such that common QEs appearing across query workloads 216 are stored only once, in the same manner as the QER 218. Within each entry of the QPS 700, the runtime performance metrics are recorded for separate time periods or milestones coinciding with the application of relevant tuning actions.

Upon applying a tuning action to a given table object in the RDBMS 106, a new set of zero initialized performance metrics are added to each entry of the QPS 700 whose QE refers to that table object as one of its sources. As recurring query workloads 216 and their QEs repeat, the newly initialized set of metrics are stored in the QPS 700. After metrics for a sufficient percentage of affected QEs are stored in the QPS 700, or after a maximum configured time period has expired, the Reward Function 702 of the DRIL 200 is invoked to compute an aggregate difference with the metrics of a previous time period.

FIG. 8 summarizes the logic for determining when a sufficient portion of the query workload 216 has repeated. Performance data associated with older milestones can safely be pruned from the QPS 700 when no longer needed by the Reward Function 702.

As stated earlier, one of the challenges of implementing the Reward Function 702 is that most environments include ad hoc query activity and many query workloads 216 differ only by trivial syntax or orderings. The QEs stored in the QPS 700 have been normalized by the Optimizer 204 such that all equivalent instances of the QEs are stored only once and their frequencies are merely updated. Furthermore, while it is true that many query workloads 216 have a fair number of non-recurring QEs, this solution makes the observation that most query workloads 216 include the same common QEs in the form of single table conditions, join conditions, and aggregations. This observation is generally true because all QEs in a given query workload 216 are performed against common table schemas which, in turn, have common primary and/or foreign key relationships. By measuring the difference in performance on the underlying common QEs, the Reward Function 702 has wider coverage and can be evaluated more promptly.

Referring to the specific logic shown in FIG. 8, a $N\_QE_A$ is the number of distinct $QE_S$ relevant to tuning action A that was applied at time T, and $N\_QE_{AT}$ is the number of $N\_QE_A$ instances whose performance has been revaluated after time T. If $N\_QE_{AT}$ divided by $N\_QE_A$ is greater than 0.50 (or some other value), or if a current timestamp minus T is greater than 1 week (or some other value), then the Reward Function of the DRIL 200 is invoked with the values A and T; otherwise, the logic sleeps (suspends) for 1 hour (or some other value) in order to try again at a later time.

Semi-Terminal Tuning States

Unlike most other problem domains, physical database design and tuning does not come to a definitive conclusion as a terminal state within the workflow of the DRIL 200. DBAs normally suspend physical database design and tuning once a query workload 216 achieves its Service Level Agreement (SLA) or other metric, but will resume physical database design and tuning if that ideal condition is subsequently lost. In addition, certain types of tuning actions must be suspended when the upper bounds related to system configuration limits are reached.

In the specific case of index selection, no additional index structures should be created once available disk space has been exhausted. When this condition is reached, the DBS 100 can continue to drop non-useful indexes as a tuning action, which in turn frees up space. To support these special semi-terminal states, Environment Conditions are introduced that result in suspending or restricting the workflow of the DRIL 200, as shown in FIG. 9.

The Environment Conditions include Active_Full_Tuning (e.g., an active DRIL 200 workflow using all available tuning actions), Suspend_Creation_Tuning (e.g., an active DRIL 200 workflow restricted to "Drop" tuning action types), and Suspend_All_Tuning (e.g., the DRIL 200 workflow is stopped). Referring to the specific logic shown in FIG. 9, if a Service Level Agreement has been met, then the Environment Condition is set to Suspend_All_Tuning; otherwise, if there is no more available space, then the Environment Condition is set to Suspend_Creation_Tuning; otherwise, the Environment Condition is set to Active_Full_Tuning.

Figure 10:
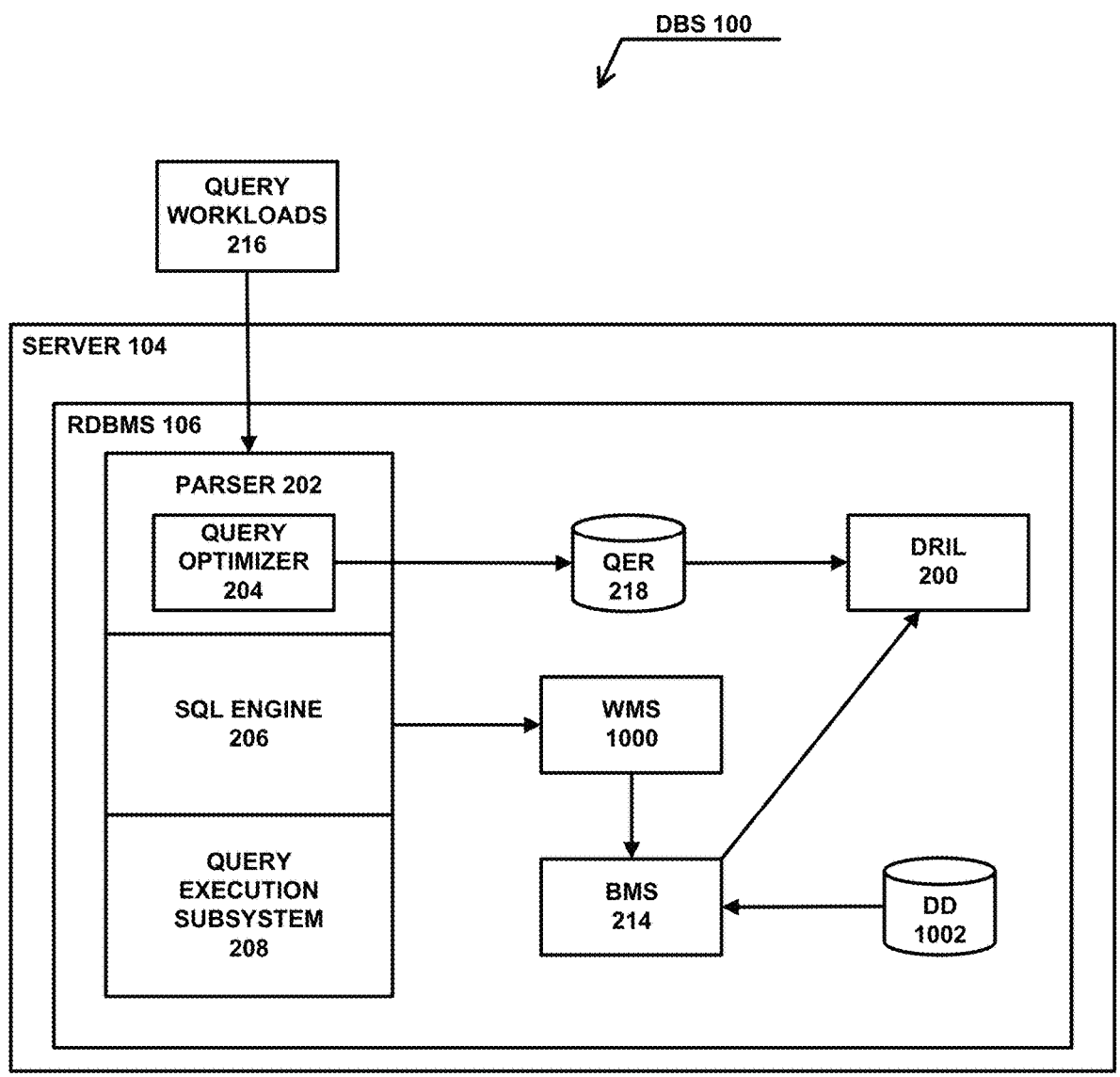
FIG. 10 illustrates how a Background Monitoring Service may communicate the Environment Conditions as an input parameter to the DRL-based feedback loop process.

As described previously in FIG. 2, the Background Monitoring Service 214 can schedule and invoke the DRIL 200. Upon starting or restarting the DRIL 200, the Background Monitoring Service 214 may communicate the current Environment Conditions as an input parameter to the DRIL 200, as shown in FIG. 10. As part of this solution, the responsibilities of the Background Monitoring Service 214 are extended to monitor data sources within the RDBMS 106 necessary to determine the current Environment Conditions. Such sources may include a Workload Management Subsystem (WMS) 1000 that is responsible for regulating DBS 100 resources to achieve SLAs and a Data Dictionary (DD) 1002 that records the available space for individual databases and their objects in the RDBMS 106.

Finally, it is noted that, in a Workload Management Subsystem 1000 [15], SLAs are often specified at the level of the individual query workload 216. If the current state of such SLAs is maintained within the QER 218 (e.g., for top-level QEs only), a subset of query workloads 216 meeting their SLAs can be filtered from the query workloads 216 provided as input to the DRIL 200, which means that the DRIL 200 effectively focuses its tuning on "bad" query workloads 216 that do not meet their SLAs.

Trust and Black Box Visibility

The recommendations generated by the Advisor 210 are inherently explainable to DBAs as they represent the Optimizer's 204 estimated cost benefits to the query workload 216. This "white box" behavior is also true of the Reward Function 702 of the DRIL 200, which represents the actual performance benefit (or lack of) from applying a recommended tuning action. However, the tuning actions recommended by the DRIL 200 and its corresponding VFA-based predictions are not explainable to DBAs as they perform "black box" behavior typical of DRL methods. In particular, the VFA-predicted rewards do not correspond to any external meaningful values.

In developing a solution that will encourage DBAs to trust the DRIL 200 and its actions, an observation is made that a large portion of the impact experienced by DBAs from bad tuning actions is the effort required to identify and reverse them to limit their damage. Unlike agents operating in most DRL environments, the DRIL 200 is allowed to reverse its tuning actions after realizing its mistakes. This invention capitalizes on this by automatically reversing tuning actions whose computed Reward Function 702 is negative. To support this, the regular state transition and learning workflow as described in FIG. 3 is overridden such that a next tuning action is forced to be a reversal of a prior tuning action. In the case of a prior tuning action that creates an index, a reversal of the tuning action is simply to drop the index which, in turn, frees up space and avoids any ongoing maintenance costs. Assured that the DRIL 200 will automatically identify and reverse bad tuning actions, DBAs are much more likely to trust, or at least tolerate, the DRIL 200 and its "black box" behavior.

SUMMARY

In summary, this disclosure presents a solution that retains the best capabilities of established Query Optimizer-based tuning Advisors and infuses them with Deep Reinforcement Learning (DRL) methods. In doing so, this invention introduces novel methods for applying DRL in a complex commercial analytics query processing system. The resulting new hybrid solution should deliver significantly better tuning action recommendations than prior technologies.

REFERENCES

The following patents and publications are incorporated by reference herein:

[1] U.S. Pat. No. 7,499,907, issued Mar. 3, 2009, to Douglas P. Brown et al., entitled "Index Selection in a Database System."

[2] Surajit Chaudhuri et al. An efficient cost-driven index selection tool for Microsoft SQL server. Proceedings of the 23rd VLDB Conference. 1997.

[3] Gary Valentin et al. DB2 advisor: an optimizer smart enough to recommend its own indexes. ICDE 2000.

[4] Renata Borovica et al. Automated physical designers: what you see is (not) what you get. DBTest '12. May 21, 2012.

[5] Ankur Sharma et al. The case for automatic database administration using deep reinforcement learning. arXiv: 1801.05643v1. Jan. 17, 2018.

[6] Teradata Vantage: The Platform for Pervasive Data Intelligence. 2019. www.teradata.com/Products/Software/Vantage.

[7] U.S. patent application Ser. No. 16/728,387, filed on Dec. 27, 2019, by Grace Kwan-On Au, et al., entitled "Query Expression Repository," attorneys' docket number 19-1003.

[8] Shrainik Jain et al. Query2Vec: An Evaluation of NLP Techniques for Generalized Workload Analytics. arXiv: 1801.05613v2. Feb. 2, 2018.

[9] U.S. Pat. No. 7,127,456, issued Oct. 24, 2006, to Douglas P. Brown, et al., and entitled "System and Method for Logging Database Queries."

[10] Yuxi Li. Deep Reinforcement Learning: An Overview. arXiv:1701.07274v6. Nov. 26, 2018.

[11] Francisco S. Melo et al. An analysis of reinforcement learning with function approximation, Proceedings of the 25th international conference on Machine learning, p. 664-671, Jul. 5-9, 2008.

[12] Viktor Leis et al. How good are query optimizers, really? Proceedings of the VLDB Endowment. Vol. 9, No. 3. 2015.

[13] Konstantinos Morfonios et al. Consistent Synchronization Schemes for Workload Replay. Proceedings of the VLDB Endowment. Vol. 4, No. 12. pp. 1225-1236. August 29 -Sep. 3, 2011.

[14] Ryan Marcus et al. Deep Reinforcement Learning for Join Order Enumeration. arXiv:1803.00055v2. Mar. 12, 2018.

[15] U.S. Pat. No. 8,151,269, issued Apr. 3, 2012, to Douglas P. Brown et al., and entitled "Database System having a Service Level Goal Responsive Regulator."

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus, comprising:
   (a) a relational database management system (RDBMS) executing in a computer system, wherein the RDBMS manages a relational database comprised of one or more tables storing data; and
   (b) a Deep Reinforcement Learning (DRL) based feedback loop process executing in the computer system for recommending one or more tuning actions for physical database design and tuning of the RDBMS, wherein:
   the DRL-based feedback loop process uses a neural network framework to select the tuning actions based on one or more query workloads performed by the RDBMS,
   one or more Environment Conditions indicate whether the DRL-based feedback loop process is to apply the tuning actions or suspend the tuning actions, and
   the tuning actions are suspended when a Service Level Agreement (SLA) for the query workloads has been met, so that the DRL-based feedback loop process focuses on other query workloads that have not met their SLA.

2. The apparatus of claim 1, wherein the DRL-based feedback loop process includes an observation mode and an active mode, wherein the observation mode allows the DRL-based feedback loop process to train and learn the tuning actions recommended by an Advisor tool, before transitioning to the active mode of the DRL-based feedback loop process recommending the tuning actions.

3. The apparatus of claim 1, wherein the DRL-based feedback loop process uses vector encoding of the query workloads to train the neural network framework.

4. The apparatus of claim 3, wherein the query workloads are comprised of one or more query expressions (QEs) stored in a Query Expression Repository (QER) by an Optimizer.

5. The apparatus of claim 4, wherein the QER stores the QEs that are most relevant to the physical database design and tuning of the RDBMS.

6. The apparatus of claim 1, wherein the DRL-based feedback loop process includes a Reward Function that generates a positive or negative indicator of the tuning actions' success or failure, and the Reward Function accesses a Query Pattern Store (QPS) that tracks performance of the query workloads over time coinciding with the tuning actions.

7. The apparatus of claim 6, wherein the DRL-based feedback loop process reverses the tuning actions that result in the negative indicator from the Reward Function.

8. The apparatus of claim 1, wherein the tuning actions relate to index selection for the query workloads.

9. A computer-implemented method, comprising:
   (a) executing a relational database management system (RDBMS) in a computer system, wherein the RDBMS manages a relational database comprised of one or more tables storing data;
   (b) executing a Deep Reinforcement Learning (DRL) based feedback loop process in the computer system for identifying one or more tuning actions for physical database design and tuning of the RDBMS, wherein:
   the DRL-based feedback loop process uses a neural network framework to select the tuning actions based on one or more query workloads performed by the RDBMS,
   one or more Environment Conditions indicate whether the DRL-based feedback loop process is to apply the tuning actions or suspend the tuning actions, and
   the tuning actions are suspended when a Service Level Agreement (SLA) for the query workloads has been met, so that the DRL-based feedback loop process focuses on other query workloads that have not met their SLA.

10. The method of claim 9, wherein the DRL-based feedback loop process includes an observation mode and an active mode, wherein the observation mode allows the DRL-based feedback loop process to train and learn the tuning actions recommended by an Advisor tool, before transitioning to the active mode of the DRL-based feedback loop process recommending the tuning actions.

11. The method of claim 9, wherein the DRL-based feedback loop process uses vector encoding of the query workloads to train the neural network framework.

12. The method of claim 11, wherein the query workloads are comprised of one or more query expressions (QEs) stored in a Query Expression Repository (QER) by an Optimizer.

13. The method of claim 12, wherein the QER stores the QEs that are most relevant to the physical database design and tuning of the RDBMS.

14. The method of claim 9, wherein the DRL-based feedback loop process includes a Reward Function that generates a positive or negative indicator of the tuning actions' success or failure, and the Reward Function accesses a Query Pattern Store (QPS) that tracks performance of the query workloads over time coinciding with the tuning actions.

15. The method of claim 14, wherein the DRL-based feedback loop process reverses the tuning actions that result in the negative indicator from the Reward Function.

16. The method of claim 9, wherein the tuning actions relate to index selection for the query workloads.

17. A computer program product, the computer program product comprising a computer readable storage medium having program instructions embodied therewith, the program instructions executable by a computer system to cause the computer system to perform a method, comprising:
   (a) executing a relational database management system (RDBMS) in a computer system, wherein the RDBMS manages a relational database comprised of one or more tables storing data;
   (b) executing a Deep Reinforcement Learning (DRL) based feedback loop process in the computer system for identifying one or more tuning actions for physical database design and tuning of the RDBMS, wherein:
   the DRL-based feedback loop process uses a neural network framework to select the tuning actions based on one or more query workloads performed by the RDBMS,
   one or more Environment Conditions indicate whether the DRL-based feedback loop process is to apply the tuning actions or suspend the tuning actions, and the tuning actions are suspended when a Service Level Agreement (SLA) for the query workloads has been met, so that the DRL-based feedback loop process focuses on other query workloads that have not met their SLA.

18. The computer program product of claim 17, wherein the DRL-based feedback loop process includes an observation mode and an active mode, wherein the observation mode allows the DRL-based feedback loop process to train and learn the tuning actions recommended by an Advisor tool, before transitioning to the active mode of the DRL-based feedback loop process recommending the tuning actions.

19. The computer program product of claim 17, wherein the DRL-based feedback loop process includes a Reward Function that generates a positive or negative indicator of the tuning actions' success or failure, and the Reward Function accesses a Query Pattern Store (QPS) that tracks performance of the query workloads over time coinciding with the tuning actions, wherein the DRL-based feedback loop process reverses the tuning actions that result in the negative indicator from the Reward Function.

20. The computer program product of claim 17, wherein the tuning actions relate to index selection for the query workloads.

* * * * *